United States Patent
He

(10) Patent No.: US 9,464,675 B1
(45) Date of Patent: Oct. 11, 2016

(54) WEDGE FRICTION ONE-WAY CLUTCH WITH CONTROLLABLE CLUTCH LOCKING FUNCTION

(71) Applicant: Schaeffler Technologies AG & Co. KG, Herzogenaurach (DE)

(72) Inventor: Simon Xunnan He, Troy, MI (US)

(73) Assignee: Schaeffler Technologies AG & Co. KG, Herzognaurach (DE)

( * ) Notice: Subject to any disclaimer, the term of this patent is extended or adjusted under 35 U.S.C. 154(b) by 40 days.

(21) Appl. No.: 14/683,619

(22) Filed: Apr. 10, 2015

(51) Int. Cl.
F16D 41/06 (2006.01)
F16D 41/063 (2006.01)
F16D 15/00 (2006.01)

(52) U.S. Cl.
CPC ............. F16D 41/063 (2013.01); F16D 15/00 (2013.01)

(58) Field of Classification Search
CPC ...... F16D 41/063; F16D 41/06; F16D 15/00; F16D 2041/0606
See application file for complete search history.

(56) References Cited

U.S. PATENT DOCUMENTS

| | | | |
|---|---|---|---|
| 6,155,942 A * | 12/2000 | Ullein | F16H 7/1236 474/101 |
| 8,695,564 B2 * | 4/2014 | Murphy | F02B 53/08 123/18 A |
| 8,857,393 B2 * | 10/2014 | Brenner | F01L 1/3442 123/90.15 |
| 2009/0159390 A1 | 6/2009 | Davis | |
| 2014/0231208 A1 * | 8/2014 | Lee | F16D 21/00 192/48.5 |
| 2016/0032988 A1 * | 2/2016 | He | F16D 41/063 192/45.1 |
| 2016/0138662 A1 * | 5/2016 | He | F16D 41/063 192/45.1 |

* cited by examiner

Primary Examiner — Jacob S Scott
Assistant Examiner — Tinh Dang
(74) Attorney, Agent, or Firm — Chester Paul Maliszewski

(57) ABSTRACT

A wedge friction clutch with controllable clutch locking function, having an axis of rotation, an inner race, an outer race located radially outward of the inner race, and, a wedge assembly including a wedge plate located between the inner and outer races in a radial direction, a first piston arranged to displace the wedge plate in a first circumferential direction, a second piston arranged to displace the wedge plate in a second circumferential direction, opposite the first circumferential direction, and, a hydraulic circuit arranged to control the first and second pistons.

19 Claims, 6 Drawing Sheets

WEDGE FRICTION ONE-WAY CLUTCH WITH CONTROLLABLE CLUTCH LOCKING FUNCTION

TECHNICAL FIELD

The present invention relates generally to a wedge friction clutch with controllable clutch locking function. In particular, the clutch includes a wedge plate and a piston arrangement that enables operation of the clutch independent of rotation of inner and outer races for the clutch.

BACKGROUND

Wedge friction clutches typically include inner and outer races and a wedge plate disposed between the inner and outer races. It is known to engage and disengage such clutches according to the relative rotation of the inner and outer races. However, such an arrangement limits controllability of the clutches. For instance, engaging and disengaging can only be accomplished for specific relative rotation combinations.

SUMMARY

According to aspects illustrated herein, there is provided a wedge friction clutch with controllable clutch locking function, having an axis of rotation, an inner race, an outer race located radially outward of the inner race, and, a wedge assembly including a wedge plate located between the inner and outer races in a radial direction, a first piston arranged to displace the wedge plate in a first circumferential direction, and, a second piston arranged to displace the wedge plate in a second circumferential direction, opposite the first circumferential direction.

According to aspects illustrated herein, there is provided a wedge friction clutch with controllable clutch locking function, having an axis of rotation, an outer race, an inner race located radially inward of the outer race and including an extended portion extending furthest in a radial direction toward the outer race, and, an inner circumference, and, a wedge assembly including a wedge plate located between the inner and outer races in the radial direction and including first and second chambers connected to the inner circumference by first and second through-bores, respectively, and, first and second circumferential ends, and, a first piston housed in the first chamber and arranged to displace in a first circumferential direction to engage the first circumferential end to displace the wedge plate in the first circumferential direction to initiate a locked mode in which the inner and outer races are non-rotatably connected, and, a second piston housed in the second chamber and arranged to be displaced in a second circumferential direction, opposite the first circumferential direction, to engage the second circumferential end to displace the wedge plate in the second circumferential direction to initiate a free-wheel mode in which the inner and outer races are independently rotatable with respect to each other.

According to aspects illustrated herein, there is provided a method of operating a, wedge clutch including an axis of rotation, an inner race, an outer race located radially outward of the inner race, and a wedge assembly including a first piston, a second piston, and a wedge plate located between the inner and outer races, the method having the steps of displacing the wedge plate in a first circumferential direction with the first piston, non-rotatably connecting the inner and outer races and the wedge plate, displacing the wedge plate in a second circumferential direction, opposite the first circumferential direction, with the second piston, and, separating, in a radial direction, respective surfaces of the inner and outer races and the wedge plate to enable independent rotation of the inner and outer races.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

At the outset, it should be appreciated that like drawing numbers on different drawing views identify identical or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
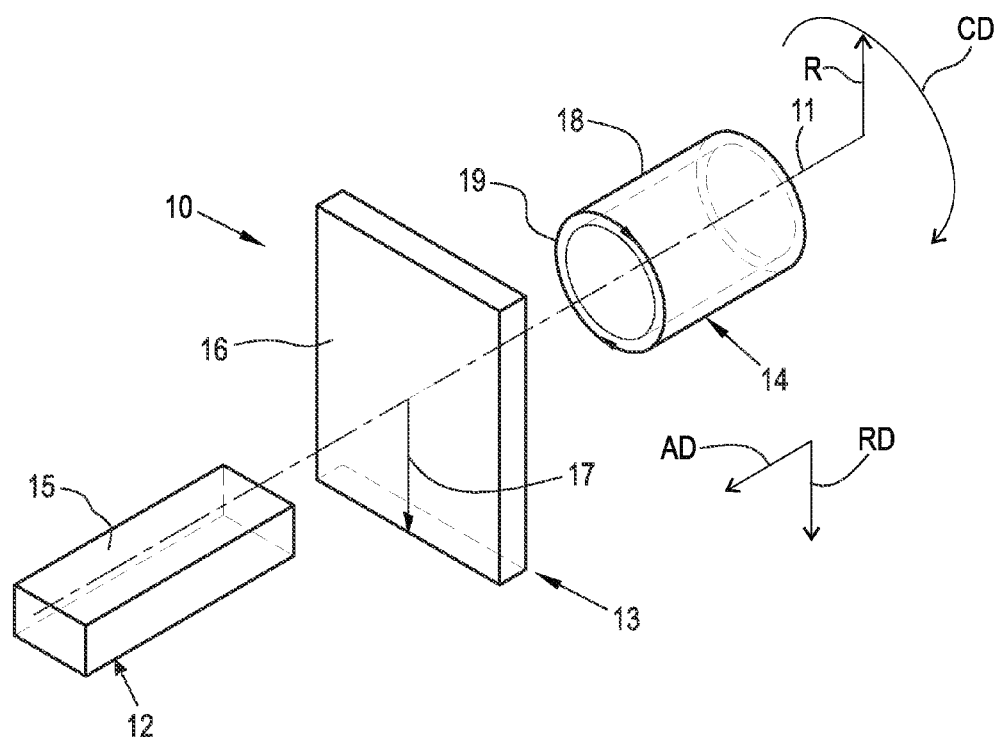
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
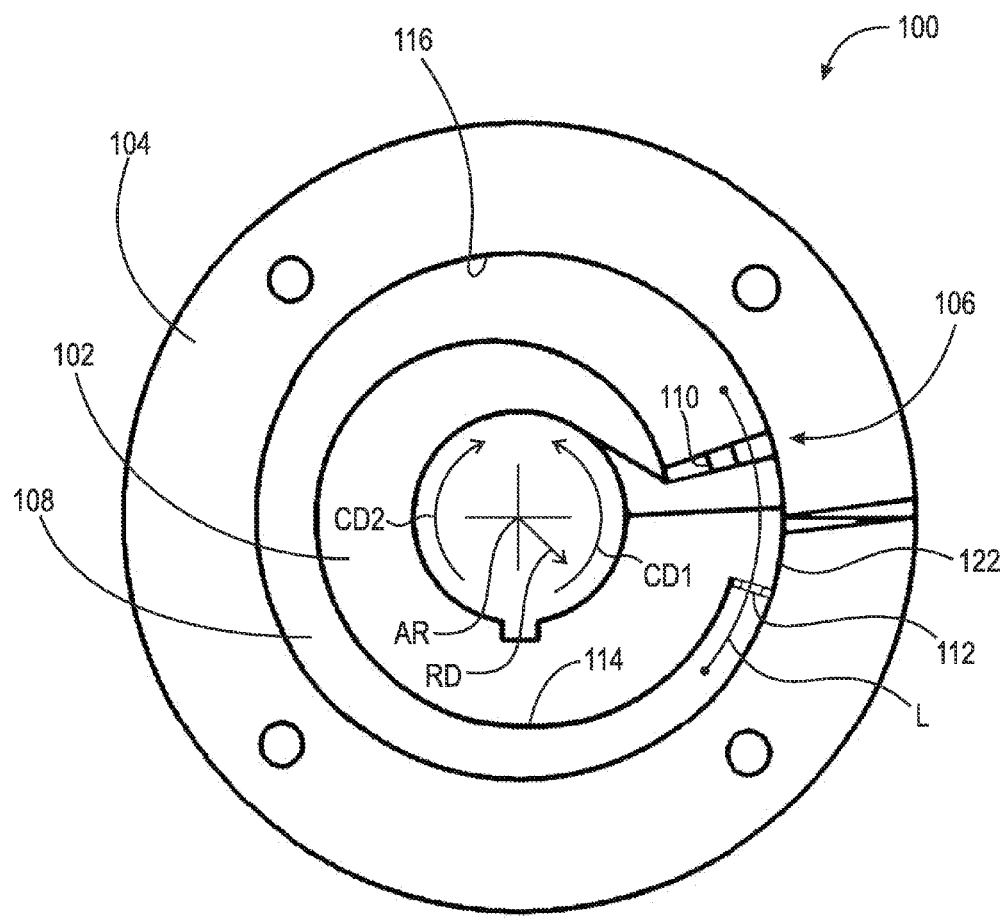
FIG. 2 is a front view of a wedge clutch with the controllable clutch locking function.

FIG. 2 is a front view of wedge friction clutch 100 with controllable clutch locking function.

Figure 3:
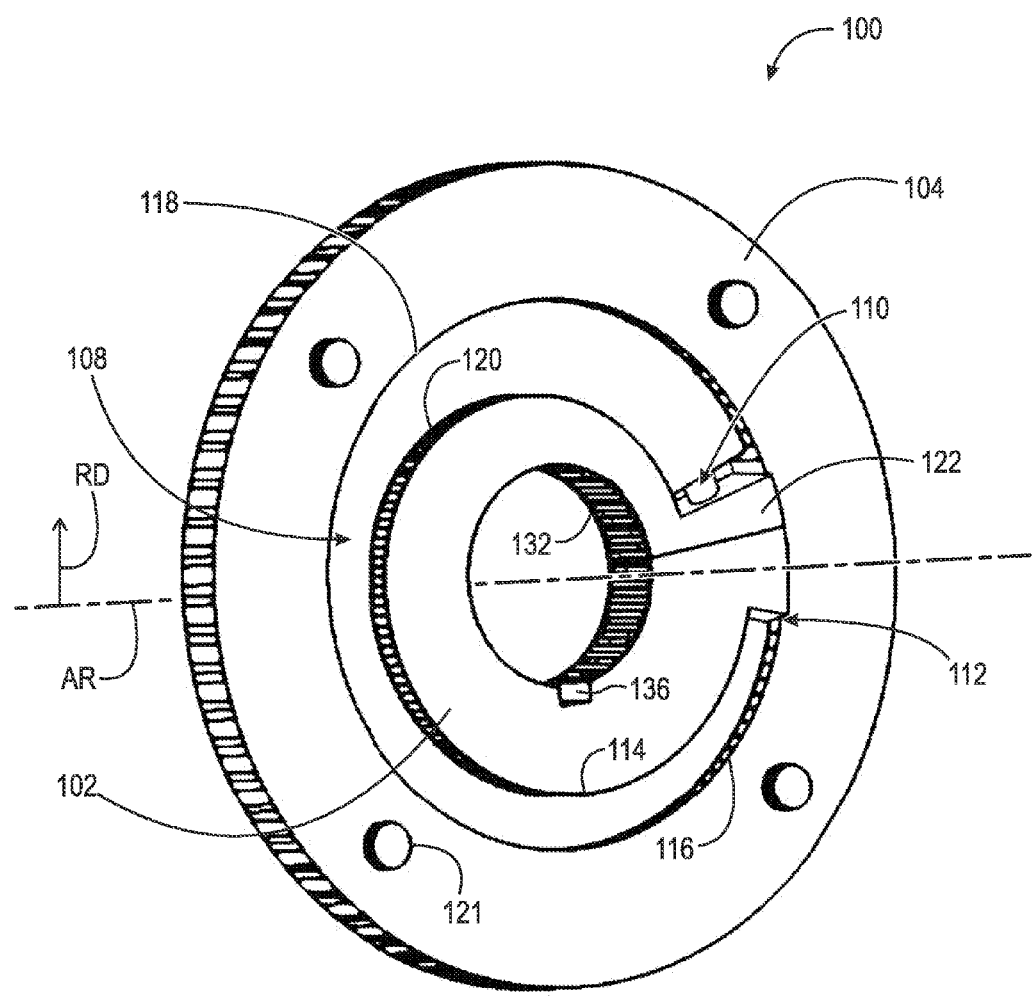
FIG. 3 is a perspective front view of the wedge clutch of FIG. 2.

FIG. 3 is a perspective front view of wedge friction clutch 100 of FIG. 2.

Figure 4:
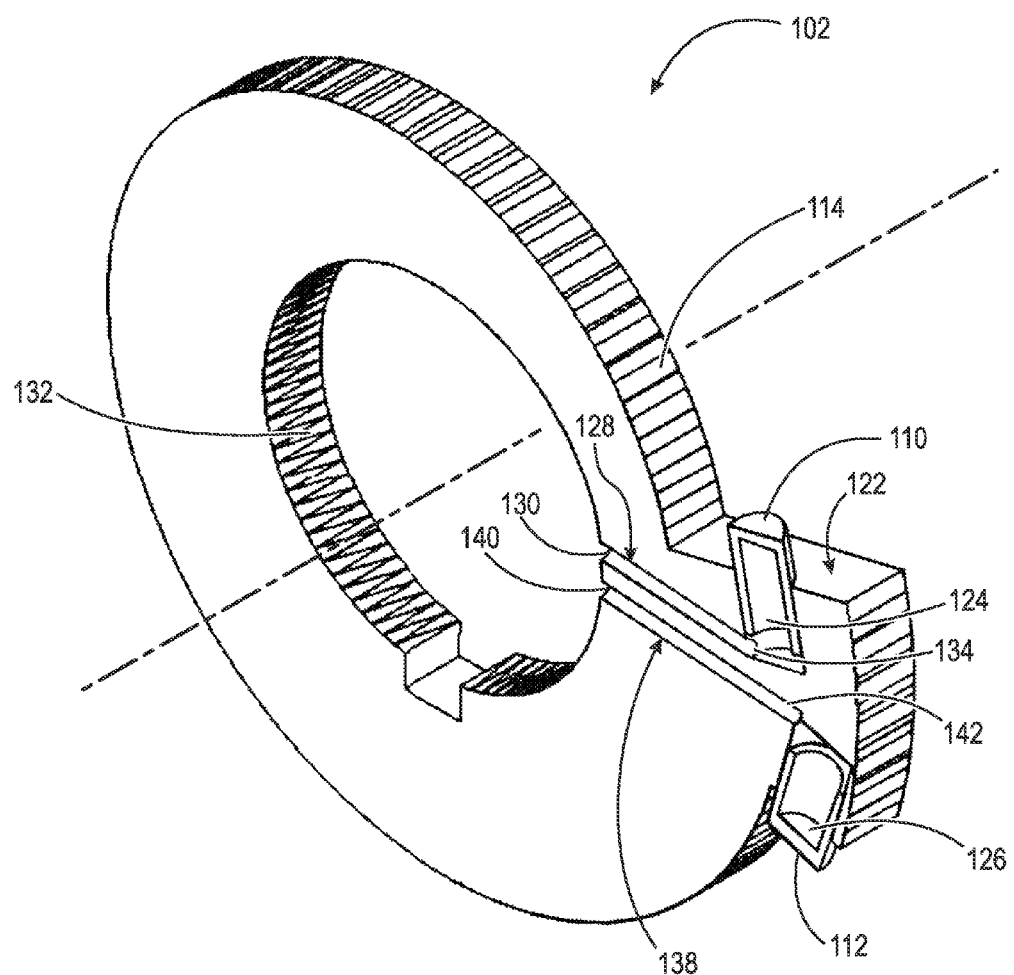
FIG. 4 is a cross-sectional view of the inner race of FIG. 2 along a plane orthogonal to an axis of rotation for the clutch.

FIG. 4 is a cross-sectional view of the inner race of FIG. 2 along a plane orthogonal to an axis of rotation for the clutch.

Figure 5:
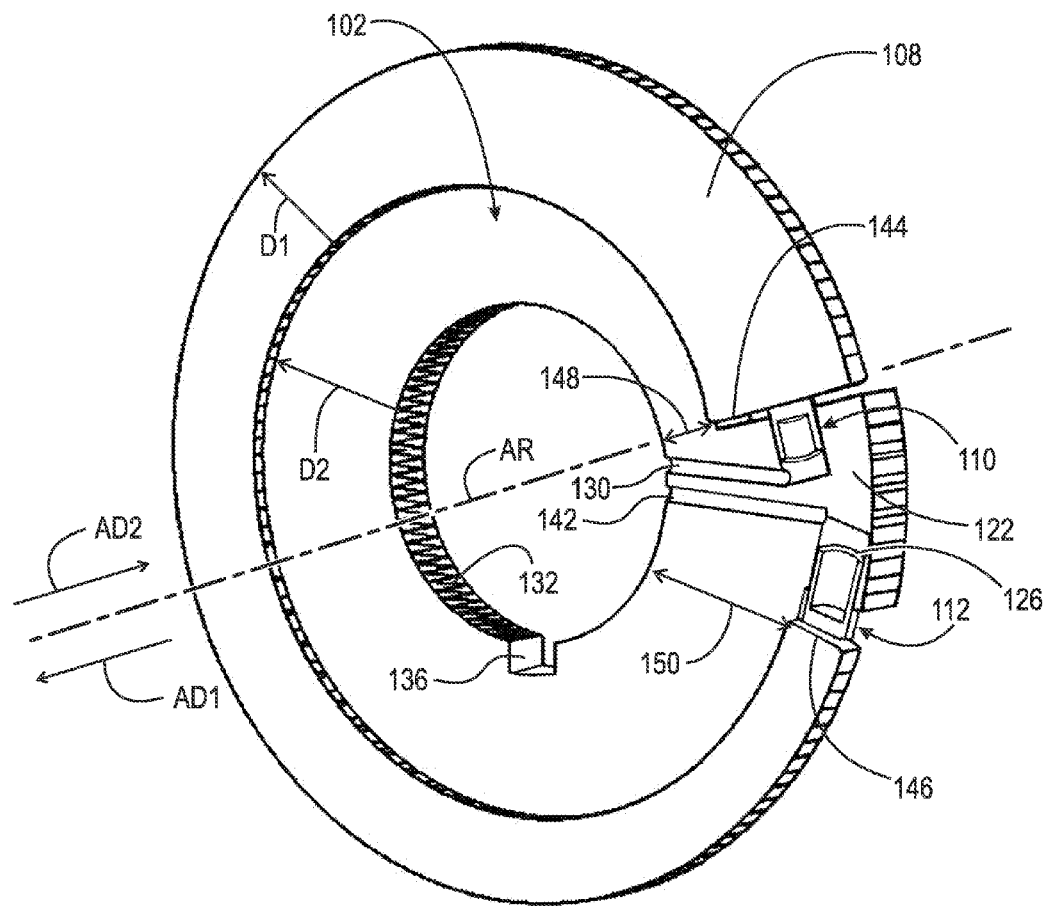
FIG. 5 is a cross-sectional view of the inner race and wedge plate of FIG. 2 along a plane orthogonal to an axis of rotation for the clutch.

FIG. 5 is a cross-sectional view of the inner race and wedge plate of FIG. 2 along a plane orthogonal to an axis of rotation for the clutch. The following should be viewed in light of FIGS. 2 through 5. Wedge friction clutch 100 includes: axis of rotation AR; inner race 102; outer race 104 located radially outward of inner race 102, for example in radial direction RD; and wedge assembly 106. Wedge assembly 106 includes wedge plate 108 located between races 102 and 104 in radial direction RD, piston 110 and piston 112.

For a locked mode in which races 102 and 104 are non-rotatably connected, piston 110 is arranged to displace wedge plate 108 in circumferential direction CD1. For a free-wheel mode in which races 102 and 104 are independently rotatable with respect to each other, piston 112 is arranged to displace wedge plate 108 in circumferential direction CD2, opposite circumferential direction CD1.

Inner race 102 includes radially outermost surface 114. Outer race 104 includes radially innermost surface 116. Wedge plate 108 includes radially outermost surface 118 (labeled in FIG. 3) and radially innermost surface 120. For the locked mode: at least respective portions of surfaces 114 and 120 are in contact and non-rotatably connected; and at least respective portions of surfaces 116 and 118 are in contact and non-rotatably connected. In an example embodiment, outer race 104 has rivet points 121 circumferentially displaced from each other to attach to a component that can either drive race 104 or be driven by race 104.

Inner race 102 includes portion 122 extending furthest in radial direction RD toward outer race 104. Portion 122 has chambers 124 and 126. Piston 110 is housed in chamber 124. Piston 112 is housed in chamber 126. Inner race 102 also includes through-bore 128 including end 130 open to inner circumference 132 of the inner race, and end 134 open to chamber 124. Inner race 102 includes gap 136 to mesh with a component that can either drive inner race 102 or be driven by inner race 102. Inner race 102 includes through-bore 138 having end 140 open to inner circumference 132 of the inner race, and end 142 open to chamber 126.

For a locked mode, fluid is supplied to chamber 124 through through-bore 128 to displace piston 110 in circumferential direction CM so that piston 110 displaces wedge plate 108 in direction CD1. Further, fluid is drained from chamber 126 through through-bore 138 so that piston 112 retracts into chamber 126 in direction CD1.

For a free-wheel mode, fluid is supplied to chamber 126 through through-bore 138 to displace piston 112 in circumferential direction CD2 so that piston 112 displaces wedge plate 108 in direction CD2. Further, as wedge plate 108 displaces in direction CD2, the wedge plate pushes piston 110 so that fluid is drained from chamber 124 through through-bore 128 and piston 110 retracts into chamber 124 in direction CD2.

For a locked mode, fluid is supplied to chamber 124 through through-bore 128 to displace piston 110 in circumferential direction CD1 so that piston 110 displaces wedge plate 108 in direction CD1. Further, as wedge plate 108 displaces in direction CD1, the wedge plate pushes piston 112 so that fluid is drained from chamber 126 through through-bore 138 and piston 112 retracts into chamber 126 in direction CD1.

Wedge plate 108 includes circumferential ends 144 and 146. Dimension D1 of wedge plate 108, in radial direction RD, decreases moving from end 144 toward end 146 in direction CD1. That is, a radial extent of wedge plate 108 tapers in direction CD1. Inner race 102 includes portions 148 and 150 radially aligned with ends 144 and 146, respectively. Dimension D2 of the inner race, in radial direction RD, increases moving from portion 148 toward portion 150 in direction CD1.

Line L, in direction CD1 or CD2, passes through portion 122 and circumferential ends 144 and 146. In an example embodiment, no portion of wedge assembly 106 extends beyond race 102 or race 104 in opposite axial directions AD1 or AD2.

Figure 6:
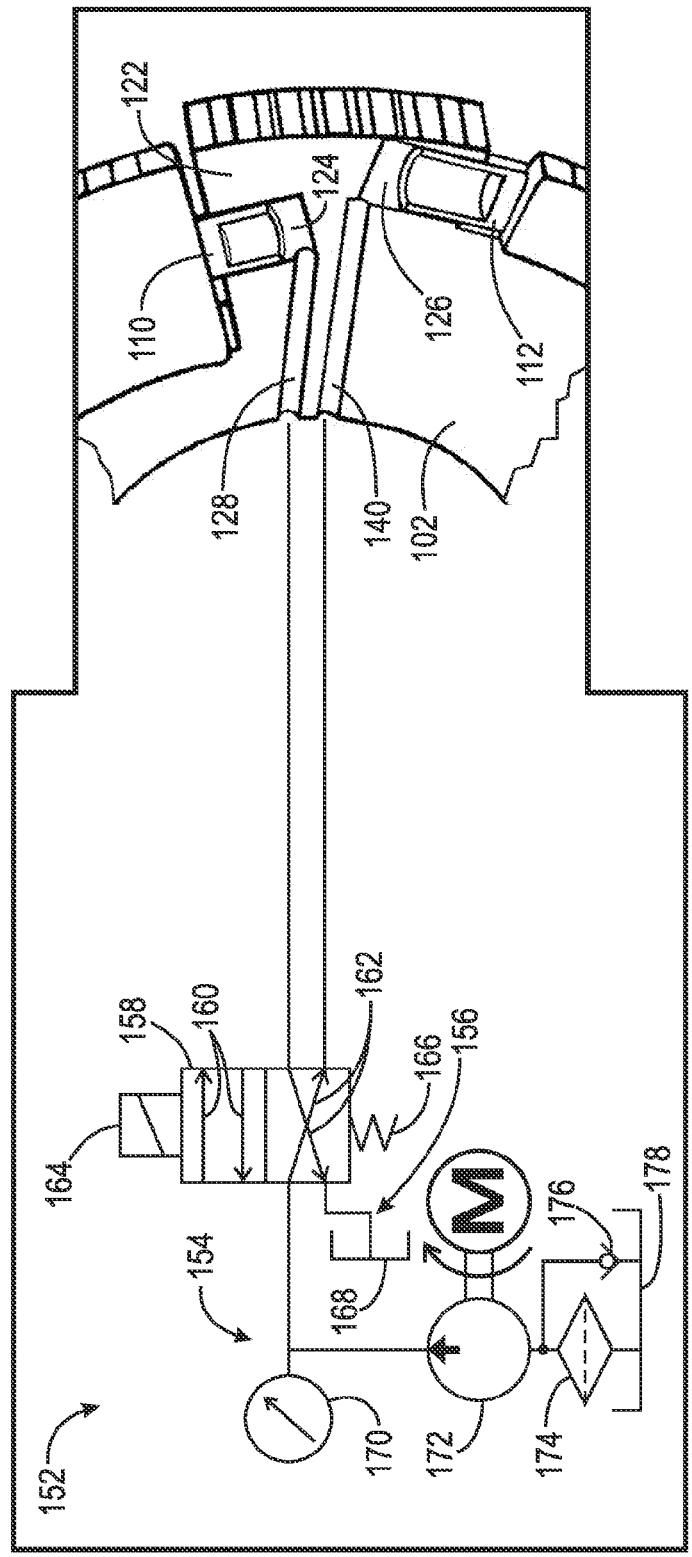
FIG. 6 is a fragmentary schematic view showing the connection of the wedge clutch to an oil circuit.

FIG. 6 is a fragmentary schematic view showing the connection of the wedge clutch to hydraulic circuit 152. In an example embodiment, hydraulic circuit 152 is a four-way, two position, direct solenoid-operated, spring-return control valve that controls pistons 110 and 112.

Valve 152 has high-pressure branch 154 and low-pressure branch 156. When the clutch is in locked mode, spool 158 is in a position connecting chamber 124 to high-pressure branch 154 and chamber 126 to low-pressure branch 156 with port pair 160. In this position, fluid flows from high-pressure branch 154 through through-bore 128 and into chamber 124. This fluid supply increases the pressure in chamber 124, which causes piston 110 to extend away from portion 122 of the inner race and displace wedge plate 108 in circumferential direction CD1. Also in this position, fluid flows from chamber 126 through through-bore 138 and into low-pressure branch 156. This fluid loss decreases the pressure in chamber 126, which causes piston 112 to retract into cavity 126 towards portion 122 of the inner race.

When the clutch is in free-wheel mode, spool 158 is in a position connecting chamber 126 to high-pressure branch 154 and chamber 124 to low-pressure branch 156 with port pair 162. In this position, fluid flows from high-pressure branch 154 through through-bore 138 and into chamber 126. This fluid supply increases the pressure in chamber 126, which causes piston 112 to extend away from portion 122 of the inner race and displace wedge plate 108 in circumferential direction CD2. Also in this position, fluid drains from chamber 124 through through-bore 128 and into low-pressure branch 156. This fluid loss decreases the pressure in chamber 124, which along with the displacement of wedge plate 108, causes piston 110 to retract into cavity 124 toward portion 122 of the inner race.

To switch between the locked mode and the free-wheel mode, solenoid 164 and spring 166 shift spool 158 into a position that aligns either port pair 160 or port pair 162 with ends 130 and 140 of through-bores 128 and 138, respectively. In the locked mode, the force acting on spool 158 by solenoid 164 overcomes the force acting on spool 158 by spring 166. In the free-wheel mode, the force acting on spool 158 by spring 166 overcomes the force acting on spool 158 by solenoid 164. In an example embodiment, solenoid 164 is energized to shift spool 158 and initiate the locked mode, and solenoid 164 is de-energized to enable spring 166 to shift spool 158 and initiate the free-wheel mode.

In an example embodiment, low-pressure branch 156 has reservoir 168. In an example embodiment, high-pressure branch 154 has rotary device 170, for example a pump or motor, a fixed volume single stage hydraulic pump 172, fluid conditioning device 174, check valve 176, and reservoir 178. In an example embodiment, fluid conditioning device 174, check valve 176 and reservoir 178 make up a hydraulic suction strainer with a bypass. The pumps and the check valve maintain a pressure higher than the pressure in chambers 124 and 126.

It should be understood that clutch 100 is not limited to the circumferential orientation shown in FIGS. 2 through 6. For example, the configuration of clutch 100 could be circumferentially reversed so that wedge plate 108 and inner race 102 taper in directions CD2 and CD1, respectively, piston 110 urges wedge plate 108 in direction CD2, and piston 112 displaces wedge plate 108 in direction CD1.

The following should be viewed in light of FIGS. 2 through 6. The following describes a method of operating wedge clutch 100. Although the method is presented as a sequence of steps for clarity, no order should be inferred from the sequence unless explicitly stated. A first step displaces, using piston 110, wedge plate 108 in direction CD1. A second step non-rotatably connects races 102 and 104 and wedge plate 108. A third step displaces, using piston 112, wedge plate 108 in direction CD2. A fourth step separates, in radial direction RD, surfaces 116 and 118 and surfaces 120 and 114 to enable independent rotation of races 102 and 104.

Displacing wedge plate 108 in direction CD1 includes: supplying fluid to chamber 124 from through-bore 128; displacing piston 110 in direction CD1 in response to the fluid in chamber 124; and displacing circumferential end 148 of the wedge plate with piston 110. Displacing wedge plate 108 in direction CD2 includes: supplying fluid to chamber 126 from through-bore 138; displacing piston 112 in direction CD2 in response to the fluid in chamber 126; and displacing circumferential end 146 of the wedge plate with piston 112.

Non-rotatably connecting races 102 and 104 and wedge plate 108 includes bringing into contact and non-rotatably engaging: at least respective portions of surfaces 116 and 118, and at least respective portions of surfaces 114 and 120.

Piston 110 is located in chamber 124 in extended portion 122 of the inner race, the extended portion extending furthest in radial direction RD toward the outer race. Piston 112 is located in chamber 126 in extended portion 122. Displacing the wedge plate in the circumferential direction CD1 includes: supplying fluid to chamber 124 from a hydraulic circuit through through-bore 128; displacing piston 110 in circumferential direction CD1 in response to the fluid in the chamber 124; and displacing circumferential end 144 of the wedge plate with piston 110.

Displacing the wedge plate in circumferential direction CD1 includes: supplying fluid to chamber 126 from the hydraulic circuit through through-bore 138; displacing piston 112 in circumferential direction CD2 in response to the fluid in the chamber 126; and displacing circumferential end 146 of the wedge plate with piston 112.

The following provides further detail regarding wedge friction clutch 100. Advantageously, wedge assembly 106 enables operation of clutch 100 independent of rotation, or non-rotation, of races 102 and 104. That is, wedge assembly 106 is arranged to non-rotatably connect races 102 and 104 in the locked mode regardless of any respective rotation or lack of respective rotation of the races 102 and 104; and clutch 100 is arranged to transition from the locked mode to the free-wheel mode regardless of any respective rotation or lack of respective rotation of races 102 and 104. For example, frictional engagement between respective surfaces of wedge plate 108 and respective surfaces of races 102 and 104 is not needed or used to trigger engagement of clutch 100 or initiate disengagement of clutch 100. Thus, clutch 100 is operable under any and all operations of races 102 and 104.

In short, a two position hydraulic valve 154 can be used to control the connection of the wedge assembly to a pressurized oil and oil tank. When chamber 124 and piston 110 are connected to the oil supply, wedge ring 108 is pushed to locking position and the locking function of the one-way clutch is enabled. In this mode, the one-way clutch works as the normal one-way clutch. When chamber 126 is connected to the oil supply, the wedge ring 108 is pushed to the unlocking position and the locking function of the one-way clutch is disabled. In this mode, the one-way clutch is in free-wheel mode in both relative rotation directions between the inner race and the outer race.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A wedge friction clutch with controllable clutch locking function, comprising:
    an axis of rotation;
    an inner race;
    an outer race located radially outward of the inner race; and,
    a wedge assembly including:
        a wedge plate located between the inner and outer races in a radial direction;
        a first piston arranged to displace the wedge plate in a first circumferential direction; and,
        a second piston arranged to displace the wedge plate in a second circumferential direction, opposite the first circumferential direction.

2. The wedge friction clutch of claim 1, wherein:
    the first piston is arranged to displace the wedge plate to initiate a locked mode in which the inner and outer races are non-rotatably connected; and,
    the second piston is arranged to displace the wedge plate to initiate a free-wheel mode in which the inner and outer races are independently rotatable with respect to each other.

3. The wedge friction clutch of claim 2, further comprising a hydraulic circuit arranged to extend the first piston in the first circumferential direction.

4. The wedge friction clutch of claim 3, wherein the first piston is arranged to displace the wedge plate in the first circumferential direction to retract the second piston.

5. The wedge friction clutch of claim 2, further comprising a hydraulic circuit arranged to extend the second piston in the second circumferential direction.

6. The wedge friction clutch of claim 5, wherein the second piston is arranged to displace the wedge plate in the second circumferential direction to retract the first piston.

7. The friction wedge clutch of claim 1, wherein:
the inner race has:
   a portion extending furthest in the radial direction toward the outer race;
   an inner circumference; and,
   first and second chambers connected to the inner circumference by first and second through-bores, respectively;
the first piston is housed within the first chamber; and,
the second piston is housed within the second chamber.

8. The friction wedge clutch of claim 1, wherein:
the inner race has:
   a portion extending furthest in the radial direction toward the outer race;
   a hydraulic circuit; and,
   first and second chambers connected to the hydraulic circuit by first and second through-bores, respectively;
the first piston is housed within the first chamber; and,
the second piston is housed within the second chamber.

9. The friction wedge clutch of claim 8, wherein:
the wedge plate includes first and second circumferential ends; and,
the hydraulic circuit is arranged to supply fluid to the first chamber through the first through-bore to displace the first piston in the first circumferential direction to contact the first circumferential end of the wedge plate, and to supply fluid to the second chamber through the second through-bore to displace the second piston in the second circumferential direction to contact the second circumferential end of the wedge plate.

10. The friction wedge clutch of claim 1, wherein:
the wedge plate has first and second circumferential ends; and,
a dimension of the wedge plate, in the radial direction, decreases moving from the first circumferential end to the second circumferential end.

11. The friction wedge clutch of claim 1, wherein:
the wedge plate has first and second circumferential ends; and,
the inner race includes an extended portion:
   extending furthest in the radial direction toward the outer race; and,
   disposed between the first and second circumferential ends such that a line, in the first or second circumferential direction, passes through the extended portion and the first and second circumferential ends.

12. The friction wedge clutch of claim 1, wherein:
the inner race includes a first radially outermost surface;
the outer race includes a first radially innermost surface;
the wedge plate includes a second radially outermost surface and a second radially innermost surface; and, for a locked mode:
   respective portions of the first radially innermost surface and the second radially outermost surface are in contact and non-rotatably connected; and,
   respective portions of the first radially outermost surface and the second radially innermost surface are in contact and non-rotatably connected.

13. The friction wedge clutch of claim 1, wherein for a locked mode, the wedge assembly is arranged to non-rotatably connect the inner and outer races for any respective rotation or lack of respective rotation of the inner and outer races.

14. The friction wedge clutch of claim 1, wherein to switch from a locked mode to a free-wheel mode, the wedge plate is arranged to displace the first piston in the second circumferential direction.

15. The friction wedge clutch of claim 1, wherein to switch from a free-wheel mode to a locked mode, the wedge plate is arranged to displace the second piston in the first circumferential direction.

16. A method of operating a wedge clutch including an axis of rotation, an inner race,
   an outer race located radially outward of the inner race, and a wedge assembly including a first piston, a second piston, and a wedge plate located between the inner and outer races, the method comprising:
   displacing the wedge plate in a first circumferential direction with the first piston;
   non-rotatably connecting the inner and outer races and the wedge plate;
   displacing the wedge plate in a second circumferential direction, opposite the first circumferential direction, with the second piston; and,
   separating, in a radial direction, respective surfaces of the inner and outer races and the wedge plate to enable independent rotation of the inner and outer races.

17. The method of claim 16, further comprising:
controlling the first and second pistons with a hydraulic circuit.

18. The method of claim 16, wherein:
the first piston is located in a first chamber in an extended portion of the inner race, the extended portion extending furthest in the radial direction toward the outer race;
the second piston is located in a second chamber in the extended portion of the inner race; and,
displacing the wedge plate in the first circumferential direction includes:
   supplying fluid to the first chamber from a hydraulic circuit through a first through-bore;
   displacing the first piston in the first circumferential direction in response to the fluid in the first chamber; and,
   displacing a first circumferential end of the wedge plate with the first piston.

19. The method of claim 18, wherein displacing the wedge plate in the second circumferential direction includes:
   supplying fluid to the second chamber from the hydraulic circuit through a second through-bore;
   displacing the second piston in the second circumferential direction in response to the fluid in the second chamber; and,
   displacing a second circumferential end of the wedge plate with the second piston.

* * * * *